Patented May 16, 1950

2,508,070

UNITED STATES PATENT OFFICE 2,508,070

GLASS COMPOSITION

Aaron K. Lyle, West Hartford, Conn., assignor to Hartford-Empire Company, Hartford, Conn., a corporation of Delaware No Drawing. Application September 19, 1946,
Serial No. 697,910

5 Claims. (Cl. 106—52)

1

The present invention relates to a glass composition, the batch therefor, and the method for making this glass.

It has long been recognized in the glass art that, as a general rule, a high silica content in glass is desirable to promote good chemical durability and high resistance to thermal shock. However, attendant with these desirable traits are the inherent difficulties of melting, fining and forming such a glass. A recognition of these properties led to the development of the commonly used soda-lime-silica glasses wherein the soda is used as a flux to facilitate the melting of the silica at temperatures economically attainable commercially. The high proportions of soda used in the early stages of this development yielded a glass that was readily melted and formed but which was highly susceptible to chemical attack and weathering by the elements. In order to alleviate this major difficulty, lime compounds were added to act as stabilizing oxides.

The trend in recent years has been towards a lower silica and alkali content with increasing proportions of lime and other stabilizing compounds. The trend has produced a glass of moderately good properties and has tried to favor melting, fining and forming considerations as well as chemical durability and thermal shock resistivity. A representative average soda-lime glass composition in present day use has the following constituents by weight analysis:

| | Per cent |
|---|---|
| $SiO_2$ | 72.5 |
| $R_2O_3$ | 1.8 |
| RO | 9.6 |
| Alkali | 15.6 |
| Miscellaneous agents | 0.5 |

The $R_2O_3$ constituent is usually $Al_2O_3$ but may contain $Fe_2O_3$, which usually appears as an impurity.

The RO constituent is normally CaO+MgO but may, in part, be composed of BaO or other stabilizing oxides of this type.

The miscellaneous ingredients are composed of the residual compounds resulting from the use of decolorizers and fining agents. There is a wide variety of such agents well known in the glass making art.

The glass produced by the present invention is a clear, colorless, transparent soda-lime type characterized by its high silica content, low alkali content, and unusually high lime content.

2

A specific object of the present invention is to provide a finished glass of excellent chemical durability with an improvement in melting, fining and forming characteristics.

A second and important specific object is to produce a glass with high resistance to thermal shock.

A further object of the invention is to provide a batch composition for making an improved glass as aforesaid, said batch to consist of low cost materials which will result in substantial savings over the cost of batch materials used in making glasses of comparable properties.

Other and more specific objects and advantages of the present invention will appear hereinafter.

The glass of the present invention will come within the following limits as to the principal ingredients which are given in tabular form:

Table 1

| Material | Low Limit per cent | High Limit per cent |
|---|---|---|
| $SiO_2$ | 73.0 | 74.0 |
| $R_2O_3$ | 1.5 | 2.5 |
| RO | 10.3 | 12.1 |
| Alkali | 13.0 | 14.0 |
| $SO_3$ | 0.15 | 0.30 |
| Fluorine | 0.15 | 0.30 |

The percentages given are weight percentages as would be determined by a chemical analysis of the glass.

The term $R_2O_3$ used in Table 1 is intended to include certain mixed oxides, principally $Al_2O_3$, and also certain relatively small amounts of impurities, such as iron (calculated as $Fe_2O_3$).

The term RO in Table 1 includes bivalent oxides, specifically CaO, MgO, ZnO and BaO. In the usual case calcium oxide (CaO) is the principal constituent.

The "alkali" of the above table is usually principally $Na_2O$, although certain amounts of $K_2O$ may also be included therein.

The fluorine present in the final glass, as determined by analysis, is somewhat lower than would be determined by calculation from the batch ingredients, as hereinafter noted, due to the volatility of fluorine and its compounds. In Table 1, the fluorine, which would probably be introduced as $CaF_2$, should be introduced in the batch in a proportion equal approximately to twice the amount desired in the final glass. If $CaF_2$ is used as the fluorine bearing compound, the calcium will combine with oxygen to form CaO which will augment the RO compounds otherwise introduced in the batch ingredients. In calculating the required batch ingredients, due allowance must be made for this end result.

The $SO_3$ present in the final glass composition can be introduced in a variety of ways but most commonly is introduced as salt cake (sodium sulphate — $Na_2SO_4$). Glasses, approximating the general composition of this type of soda-lime glass, can normally hold in solid solution only 0.25%–0.30% $SO_3$ as a maximum. Any excess of the sulphate that is introduced over and above this amount will form a sulphate scum floating on the surface of the batch melt.

The melting and fining advantages of the present invention are contrary to predictions based on generally accepted criteria and standard glass technology text books. The combinations of such a high silica content and low alkali content would normally be expected to yield a glass with disadvantageous melting and fining characteristics. However, it has been found that the high lime content, in the presence of fluorine and $SO_3$, substantially improves the melting and fining characteristics when compared to an average soda-lime glass of the type aforementioned. Detailed data will be presented to illustrate and substantiate this statement hereinafter.

I am aware that a glass of somewhat similar properties has been disclosed in my earlier Letters Patent #2,262,951. I wish to specifically point out, however, that the unusually high lime content of the present subject glass represents a significant departure from the prior composition and results in certain new, useful, novel, and unexpected improvements over glass of the prior art. The silica content of the present subject glass is lower than the amount disclosed in my earlier Patent #2,262,951 but is still materially higher than the average soda-lime glass now in widespread use.

Several glasses have been made within the above limits, three of which are included in the following table. The glass given as Example I in this table represents the preferred embodiment of the present invention.

*Table 2*

| Material | I | II | III |
|---|---|---|---|
| $SiO_2$ | 73.3 | 73.2 | 73.0 |
| $R_2O_3$ | 2.0 | 2.0 | 1.5 |
| RO | 10.5 | 10.9 | 12.1 |
| Alkali | 13.8 | 13.5 | 13.0 |
| $SO_3$ | 0.25 | 0.25 | 0.25 |
| Fluorine | 0.25 | 0.25 | 0.25 |

The percentages given are those weight percentages as would be determined by a chemical analysis of each glass, except as hereinafter noted.

The RO constituent of Example I of Table 2 is primarily CaO which is most commonly introduced in the batch as calcite ($CaCO_3$).

The RO constituent of Example II and Example III of Table 2 is a combination of CaO and MgO such as would be supplied by dolomite ($CaCO_3 \cdot MgCO_3$).

The fluorine and $SO_3$ contents in the examples of Table 2 are those that would be determined by an actual chemical analysis of the final glass products and not the percentages that would result from calculations based on the batch ingredients.

In both Tables 1 and 2 no allowance has been made for the presence of traces of standard fining agents and decolorizers that are widely used in glass making. Much, if not all, of these agents is volatilized during the melting and fining process.

A typical batch for making the preferred embodiment of the present invention consists of the following:

| | |
|---|---|
| Sand | 1000 |
| Soda ash | 330 |
| Limestone | 270 |
| Feldspar | 160 |
| Fluorspar | 15 |
| Salt cake | 10 |
| Niter | 2 |
| Arsenic | 1 |

The above constituents represent parts by weight in the total batch.

The specific improvements and advances of the subject glass over the prior art will now be considered.

*Melting and fining*

As machine speeds of bottle forming machines have been increased within the last decade, there has been an ever-present demand for furnaces that could produce melted and fined glass at an increasing rate. Two obvious solutions to the problem exist: (1) fabrication of furnaces of increased size and (2) operation of existing furnaces at higher temperatures. Both of these methods entail increased costs to manufacturers in the glass industry.

A third method for producing increased amounts of glass per given time period from standard size furnaces has been made possible by the present invention. As is evident from the following table, the glasses conforming to this invention can be melted at substantially higher rates than average soda lime glasses for a given temperature and furnace size.

*Table 3*

[Tons/100 sq. ft. of furnace area/24 hrs.]

| Furnace Temp. | Average Glass | U. S. Pat. No. 2,262,951 | Example I Table 2 | Example II Table 2 | Example III Table 2 |
|---|---|---|---|---|---|
| °F. | | | | | |
| 2,720 | 12.3 | 14.8 | 15.8 | 13.0 | 16.6 |
| 2,750 | 14.6 | 18.1 | 20.2 | 17.3 | 18.9 |
| 2,760 | 15.6 | 19.4 | 21.6 | 18.6 | 19.7 |

Stated on the basis of a uniform melting rate of 20 tons/100 square feet of furnace area/24 hrs., the preferred embodiment of this invention requires a 2750° F. furnace temperature while an average soda lime glass requires a 2818° F. furnace temperature.

A furnace temperature of 2750° F. is well within economical commercial limits for present day glass furnaces.

A persistent problem in the field of glass production has been the difficulty of removing the gas bubbles entrapped within the molten glass. These bubbles must be removed for the most part before the glass is suitable for glassware production. The process for removing the bubbles is known as fining. Reducing the bubble or seed count to a satisfactory level requires prolonged periods of high temperature heating within the furnace.

Table 4, which follows, illustrates the advantages in fining of the present invention over the prior art. The fining times listed are those periods of time that a glass melt must be held at the specified temperature to reduce the seed count in the finished glass product to approximately 10 seeds and/or blisters (or less) per ounce of glass.

Table 4

[Fining time—minutes]

| °C. | Average Glass | U. S. Pat. No. 2,262,951 | Example I Table 2 | Example II Table 2 | Example III Table 2 |
|---|---|---|---|---|---|
| 1,450 | 90 | 70 | 74 | 94 | 51 |
| 1,475 | 55 | 35 | 27 | 40 | 32 |
| 1,490 | 43 | 24 | 16 | 24 | 24.3 |

Chemical durability

In testing glass articles, such as containers, for chemical durability, the article to be tested is filled with water, or a water solution of a strong inorganic acid or base, and then treated at a predetermined temperature, for a predetermined time, as by placing the article in an autoclave. The amount of alkali released by the glass is determined by the change in the alkali content of the solution within the article. This amount is then compared with that of other commercial glasses.

Table 5

[Test.—Water solution held at 120° C. for one hour. ½ pint bottle.]

| Glass | Milligrams of NaOH released/ liter of solution/hr. |
|---|---|
| | Mg. |
| Average glass | 12-20 |
| Example I, Table 2 | 7 |
| Example II, Table 2 | 6 |
| Glass Composition of U. S. Pat. No. 2,262,951 | 3-10 |

Inasmuch as the surface area of a container is a square function whereas the volume is a cubic function, it is important that relative values for chemical durability measurements be presented on the basis of identical size containers. The results of the test are usually reported on the basis of the formation of NaOH per volume of solution but the degree of solubility of the glass is directly related to the amount of surface area in contact with the solution.

In the event that a bottle or jar of the glass to be tested for chemical durability is not available, another test may be used which in principle is similar to the foregoing. This test, known as the grain test, involves placing glass granules of a predetermined form and amount in a solution and holding the solution at a fixed temperature for a given time period. At the end of the time period, the solution is tested for the amount of NaOH present, and from the value obtained, the degree of solubility of the $Na_2O$ constituent of the glass granules can be calculated. The solution used in this test can be either distilled water or a dilute water solution of a strong inorganic acid. The glasses of Table 2 gave the following results for this test.

Table 6

| Glass | Per cent of weight of glass tested dissolved by water solution [1] | Per cent of weight of glass tested dissolved by Acid solution [2] |
|---|---|---|
| Average glass | 0.035 | 0.050 |
| Example I, Table 2 | 0.022 | 0.027 |
| Example II, Table 2 | 0.018 | 0.020 |
| Example III, Table 2 | 0.017 | 0.020 |

[1] Water at 90° C. for four hours.
[2] 0.02 normal solution of $H_2SO_4$ at 90° C. for four hours.

The above data illustrate the extreme chemical durability of this glass and the suitability of this glass for such severe applications as use in liquor and milk of magnesia bottles.

Resistance to thermal shock

Failure of glassware due to thermal shock is basically a mechanical failure of the material in tension as a result of the large stresses set up in the material by the unequal thermal expansion accompanying thermal gradients across any section of the material. A corollary to this proposition is that a material with a low coefficient of linear thermal expansion inherently has high resistance to thermal shock.

An average soda-lime glass of the type commonly used commercially and resembling, but not encompassing, this invention in its composition has a coefficient of thermal expansion of approximately $91 \times 10^{-7}/°$ C. between 0 and 350° C.

The preferred form of my present invention (Example I, Table 2) has a coefficient of thermal expansion equal to $88 \times 10^{-7}/°$ C. between 0 and 350° C. The glass of Example II, Table 2, also encompassed by my present invention, has a coefficient of thermal expansion equal to $82 \times 10^{-7}/°$ C. between 0 and 350° C. while that of Example III, Table 2, has a value of $81.1 \times 10^{-7}/°$ C. between 0° C. and 350° C. The glass, disclosed in my earlier U. S. Patent No. 2,262,951, has a coefficient of thermal expansion equal to $84 \times 10^{-7}/°$ C. between 0 and 350° C.

Working qualities

Two of the several factors of importance in determining the working qualities of a glass are the size and location of the working range of the glass. A convenient measure of the working range of a glass has been taken to be the temperature difference between softening temperature and strain temperature of the glass.

By definition, the softening point or temperature of glass is that at which the viscosity of the glass is $4.5 \times 10^7$ poises. The strain point or temperature of a glass is that point at which the viscosity of the glass is $4.0 \times 10^{14}$ poises.

The preferred embodiment of this invention (Example I, Table 2) has a working range very similar to average soda-lime compositions. However, the location of the working range is approximately 30° F. higher than that for average soda-lime glass. This location of the working range in the higher temperature region permits higher glass machine forming speeds because of the increased rate of heat transfer to the cooling mediums used in cooling the glass molds.

Compared to average compositions, these glasses provide increased productivity ranging from three to ten per cent.

Color

The glass of the present invention is a clear, colorless, transparent glass, this being determined by inspection in comparing different types of glass. This seems to be due not only to the purity of the ingredients, which of course render any glass superior in color, but also to the fact that for a given amount of impurities, usually iron compounds, the color imparted to the glass seems to be somewhat less than that of other known glasses.

In this respect, it is specifically contemplated that the present glass may be used not only as a clear, colorless glass, but also as a base for making glasses having desired colors, such for example, as amber, light or dark greens, blue, etc. For making colored glasses, there is added to the glass of the present invention suitable coloring agents, which may be the same conventional coloring agents used in the same amounts and proportions as is common in the glass industry. Inasmuch as the nature and amount of the coloring agents used in imparting colors to the basic glass herein disclosed, per se, form no part of the present invention, such coloring agents are not specifically discussed herein.

While there is described herein a preferred form and two other glasses carrying out the present invention, and while limits have been established as set forth hereinabove defining the composition of a glass and batch materials for making it in accordance with the present invention, the invention is to be understood as measured solely by the scope of the appended claims, which are to be construed as broadly as the state of the prior art permits.

I claim:

1. A clear, transparent soda-lime type glass, comprising by weight

|  | Per cent |
|---|---|
| $SiO_2$ | 73.0 –74.0 |
| $Al_2O_3$ | 1.5 – 2.5 |
| CaO | 10.3 –12.1 |
| $Na_2O$ | 13.0 –14.0 |
| $SO_3$ | 0.15– 0.30 |
| Fluorine | 0.15– 0.30 |

2. A clear, transparent, soda-lime type glass, comprising by weight

|  | Per cent |
|---|---|
| $SiO_2$ | 73.0 –73.3 |
| $Al_2O_3$ | 1.5 – 2.2 |
| CaO | 10.5 –12.1 |
| $Na_2O$ | 13.0 –13.8 |
| $SO_3$ | 0.20– 0.30 |
| Fluorine | 0.20– 0.30 | and wherein a portion of the CaO is replaced by MgO, the Ca and the Mg being in the same proportions as in dolomite ($CaCO_3 \cdot MgCO_3$).

3. A batch for making a soda-lime type glass, comprising sand, alumina, lime, alkali, a sulphate bearing compound, and a fluorine bearing compound mixed in such proportions that the glass made therefrom as determined by analysis of the final glass, will be clear, colorless, and transparent and will have a composition by weight of

|  | Per cent |
|---|---|
| $SiO_2$ | 73.0 –74.0 |
| $Al_2O_3$ | 1.5 – 2.5 |
| CaO | 10.3 –12.1 |
| $Na_2O$ | 13.0 –14.0 |
| $SO_3$ | 0.15– 0.30 |
| Fluorine | 0.15– 0.30 |

4. A batch for making a soda-lime type glass, comprising the following ingredients in substantially the weight proportions given:

| Sand | 1000 |
|---|---|
| Soda ash | 330 |
| Limestone | 270 |
| Feldspar | 160 |
| Fluorspar | 15 |
| Salt cake | 10 |
| Niter | 2 |
| Arsenic | 1 |

5. The method of making a clear, transparent soda-lime type glass, comprising mixing together the following ingredients in substantially the following proportions:

| Sand | 1000 |
|---|---|
| Soda ash | 330 |
| Limestone | 270 |
| Feldspar | 160 |
| Fluorspar | 15 |
| Salt cake | 10 |
| Niter | 2 |
| Arsenic | 1 | and melting the mixture to form a clear, transparent glass.

AARON K. LYLE.

No references cited.